UNITED STATES PATENT OFFICE.

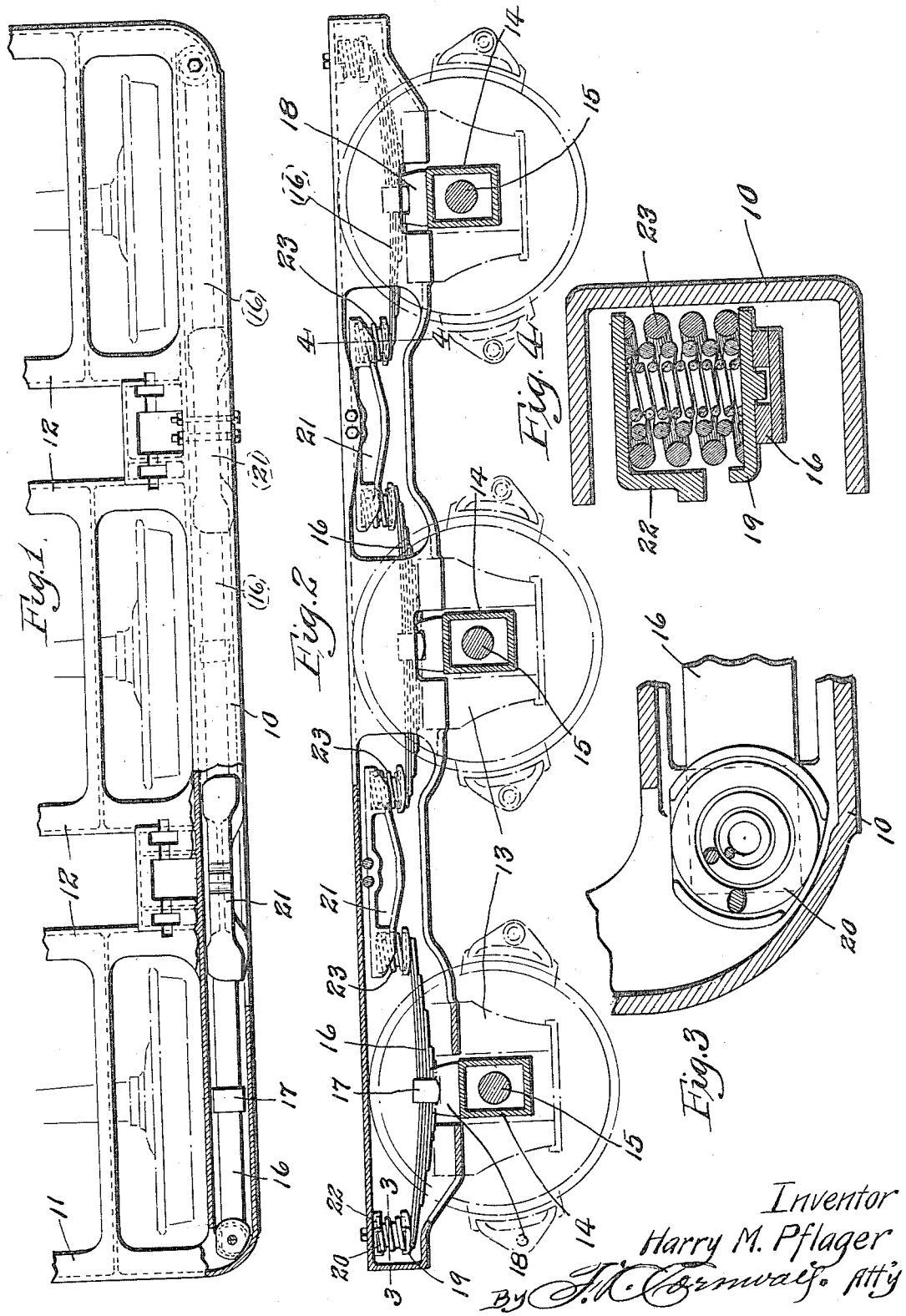

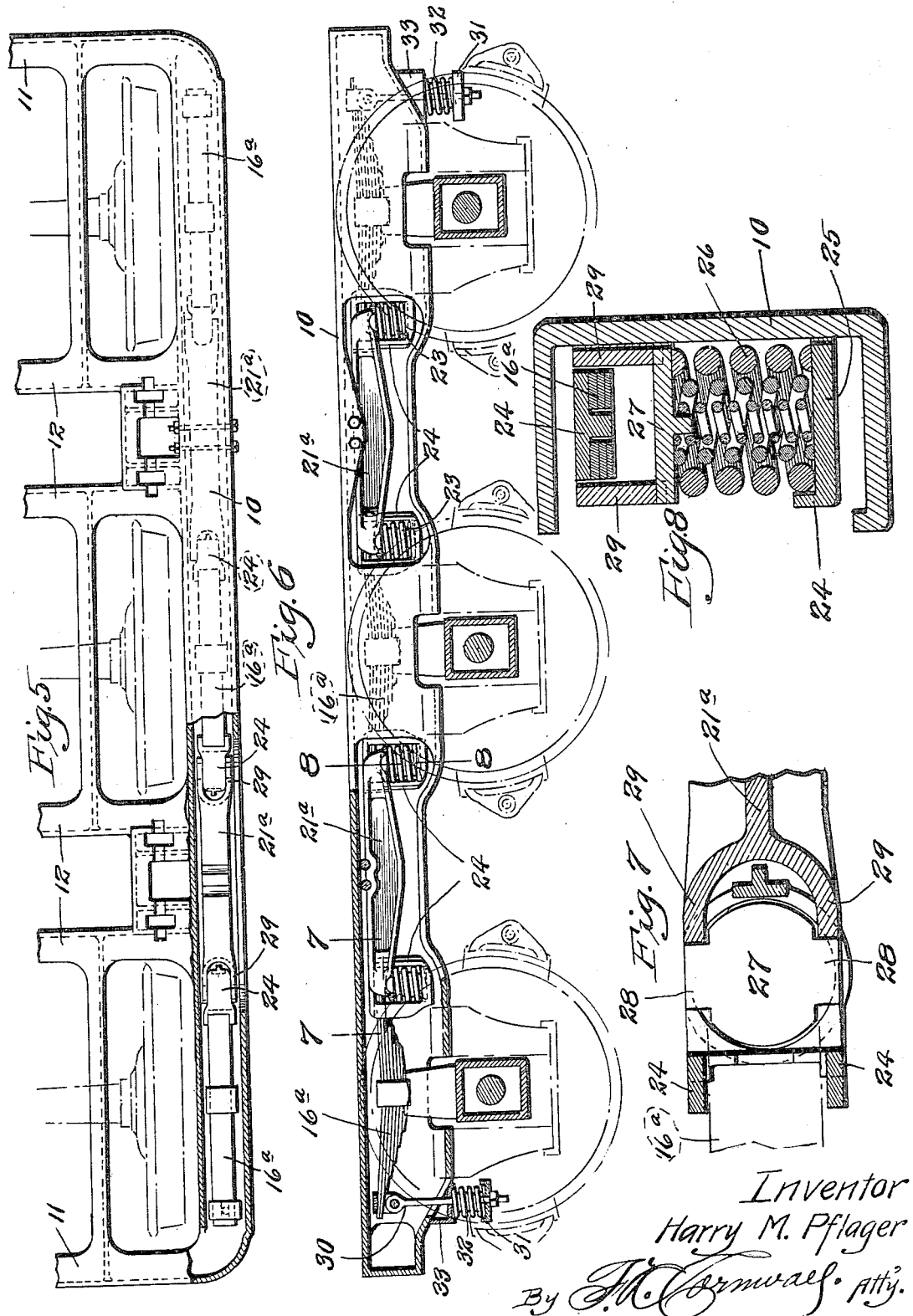

HARRY M. PFLAGER, OF ST. LOUIS, MISSOURI, ASSIGNOR TO COMMONWEALTH STEEL COMPANY, OF ST. LOUIS, MISSOURI, A CORPORATION OF NEW JERSEY.

CAR-TRUCK.

1,276,687.

Specification of Letters Patent.　　Patented Aug. 20, 1918.

Application filed July 6, 1917.　Serial No. 179,035.

*To all whom it may concern:*

Be it known that I, HARRY M. PFLAGER, a citizen of the United States, residing at St. Louis, Missouri, have invented a certain new and useful Improvement in Car-Trucks, of which the following is a full, clear, and exact description, such as will enable others skilled in the art to which it appertains to make and use the same, reference being had to the accompanying drawings, forming part of this specification.

My invention relates generally to railway car truck construction and more particularly to a new and improved spring equalizer arrangement for yieldingly supporting the truck frame upon the journal boxes, which latter it will be understood contain the bearings for the wheel carrying axles, and this application should be read and considered in connection with Patent Numbers 1,080,555, 1,080,556, 1,080,557, 1,080,558 and 1,080,559, issued to the assignee of Clarence H. Howard and myself December 9, 1913.

The principal objects of my invention are, to provide increased flexibility of the truck and equalize the distribution of weight upon all of the truck wheels; to provide a comparatively simple truck frame support which, by virtue of its arrangement and construction, will be effective in distributing and absorbing shocks and vibration due to track irregularities and preventing said shocks and vibration from being transmitted to the car body, thereby making the riding movement of said body more easy and gentle; and to dispose the flexible supporting means so that it will in nowise interfere with the free inspection, repair and adjustment of the brakes and brake rigging associated with the truck and the wheels thereof.

With the foregoing and other objects in view, my invention consists in a plurality of springs, preferably of the semi-elliptic type, and mounted upon the journal boxes of the truck, a plurality of substantially rigid or non-elastic equalizing members fulcrumed on the truck frame, said springs and equalizing members being disposed in series and located preferably within the substantially hollow wheel piece of the truck frame and there being springs preferably of the helical type arranged between the ends of the semi-elliptic springs and the equalizing members and between the outer ends of the outer pair of semi-elliptic springs and the truck frame.

My invention further consists in certain novel features of construction and arrangement of parts, hereinafter more fully described and claimed, and illustrated in the accompanying drawings, in which—

Figure 1 is a plan view of the side portion of a truck frame, a portion thereof being broken away and which frame is equipped with the flexible support contemplated by my invention;

Fig. 2 is a side elevational view of the truck frame, parts thereof being broken away and showing my improved supporting means associated therewith;

Fig. 3 is an enlarged detail section taken approximately on the line 3—3 of Fig. 2;

Fig. 4 is an enlarged cross section taken approximately on the line 4—4 of Fig. 2;

Fig. 5 is a plan view of the side portion of the truck frame and showing a modified form of the flexible support applied thereto;

Fig. 6 is a side elevational view of a truck frame and showing the modified form of support associated therewith;

Fig. 7 is an enlarged horizontal section taken approximately on the line 7—7 of Fig. 6;

Fig. 8 is a cross section taken approximately on the line 8—8 of Fig. 6.

Referring by numerals to the accompanying drawings and particularly to Figs. 1 to 4 inclusive, 10 designates the wheel piece of an accepted type of six wheel truck frame, the same being preferably of integral construction and including end pieces 11 and transom members 12.

Rigidly fixed to and depending from the wheel piece are pedestal jaws 13 between which are positioned the usual journal boxes 14 which contain the bearings for the ends of the wheel carrying axles 15.

The wheel pieces 10 of the truck frame are preferably hollow and of box-like construction in cross section with the bottom wall or plate cut away at points between the pedestal jaws for the accommodation of the journal boxes and the outer wall of said wheel piece being cut away at suitable points to permit the ready insertion or removal of the equalizer members and springs constituting my improved construction.

Located within the hollow wheel pieces are semi-elliptic springs 16 which are provided at or near their centers with encircling bands or sleeves 17, the latter being mounted for rocking movement upon suitable bearing blocks 18, the latter being positioned on the journal boxes 14. Mounted upon the ends of all of these springs are plates 19 and arranged between the plates which are carried by the outer ends of the springs 16 that are mounted on the outer or end pair of journal boxes and the top plate of the wheel piece are helical springs 20 of the compression type, that is, their normal tendency is to expand and resist compression. These springs are preferably of the nested type, that is, a number of springs of different sizes are arranged one within the other.

Fulcrumed on the wheel piece of the truck frame and preferably on the underside of the top plate thereof and at points approximately midway between the centers of the springs 16 are substantially rigid or non-elastic equalizing members 21, in the undersides of the ends of which are formed spring pockets 22. These equalizing members are of such length that the spring pockets in their ends are positioned directly over the plates 19 which are carried by the ends of the center one of the springs 16 and the plates carried by the inner ends of the outer pair of said springs 16, and interposed between the plates just mentioned and the ends of said equalizing members 21 are helical compression springs 23.

In the modified construction illustrated in Figs. 5 to 8 inclusive, leaf springs 16ª are disposed within the hollow wheel piece of the truck frame, and mounted for rocking movement upon supports carried by the journal boxes and arranged between these springs and fulcrumed on the wheel piece are substantially rigid or non-elastic equalizing members 21ª.

Both ends of the center one of the springs 16ª and the inner ends of the outer pair of said springs carry depending yokes or hangers 24. The lower ends of these yokes or hangers terminate in plates 25 and positioned thereupon are nested compression springs 26, the upper ends of which bear against plates 27, the latter being mounted for vertical sliding movement within the yokes 24.

Projecting outwardly from the sides of the plates 27 are ears 28 upon which bear the bifurcated ends 29 of the equalizing members 21ª. Depending from the outer ends of the outer pair of springs 16ª are hangers which include rods 30, the same passing through suitable openings formed in the bottom plate of the wheel piece and carried by the lower end of each rod at a point below said wheel piece is a plate 31. Positioned on each of these plates is a helical compression spring 32, the upper end thereof bearing against a suitable plate or bracket 33 which is positioned directly against the underside of the wheel piece.

In my improved construction it will be noted that the semi-elliptic or leaf springs are mounted for rocking movement upon the journal boxes, that the substantially rigid equalizing members are fulcrumed on the truck frame, and further that the ends of the leaf springs and equalizing members and the ends of the outer pair of leaf springs and the truck frame are connected by means of helical springs of the compression type. By virtue of this arrangement, a truck frame supporting structure is provided which is yielding and resilient to a comparatively high degree with the result that service shocks and vibration due to the passage of the truck wheels over rough track, switches, crossings and the like are practically absorbed and eliminated and the riding movement of the supported car body is rendered more easy and gentle.

The improved spring and equalizer arrangement is effective in materially increasing the flexibility of the truck and equalizing the distribution of the carried weight upon all of the truck wheels. Furthermore, by arranging the springs and equalizer members within the hollow wheel pieces of the truck frame they are practically inclosed and consequently protected from injury, and further such arrangement leaves the brake beams, brake shoes and brake rigging free for inspection and readily accessible in the event of repairs and adjustments.

While I have illustrated and described my invention as being particularly applicable for six wheel trucks, it will be understood that practically the same arrangement can be advantageously utilized in connection with trucks having other wheel arrangements.

It will be readily understood that minor changes in the size, form and construction of the various parts of my improved car truck can be made and substituted for those herein shown and described, without departing from the spirit of my invention, the scope of which is set forth in the appended claims.

I claim:

1. A flexible support for railway car trucks comprising springs balanced upon the journal boxes associated with the truck frame, substantially rigid equalizing members fulcrumed upon the truck frame between the journal boxes, coil springs interposed between the ends of the resilient members and said equalizing members and coil springs interposed between the outer ends of the outer pair of springs and the truck frame.

2. The combination with a car truck frame having a substantially hollow wheel piece and the journal boxes associated therewith, of springs balanced upon the journal boxes, equalizing members fulcrumed on the truck frame between said springs, coil springs interposed between the ends of said balanced springs and equalizing members, and coil springs interposed between the outer ends of the outer pair of balanced springs and the truck frame, all of which springs and equalizing members are disposed within the hollow wheel piece of the truck frame.

3. A flexible support for railway car trucks comprising resilient members mounted upon the journal boxes associated with the truck, equalizing members fulcrumed on the truck frame, hangers depending from the ends of the resilient members, and springs associated with said hangers and interposed between the resilient members and the equalizing members and between certain of said resilient members and the truck frame.

4. The combination with a car truck and the journal boxes associated therewith, of semi-elliptic springs supported by the journal boxes, rigid equalizing members fulcrumed on the wheel piece of the truck frame between the semi-elliptic springs, coil springs interposed between the ends of the semi-elliptic springs and the rigid equalizing members, and coil springs interposed between the outer ends of the outer pair of semi-elliptic springs and the wheel piece of the truck frame.

In testimony whereof I hereunto affix my signature this 26th day of June, 1917.

HARRY M. PFLAGER.